United States Patent [19]

Goldman

[11] Patent Number: 4,840,236

[45] Date of Patent: Jun. 20, 1989

[54] HYDRAULIC-PNEUMATIC ACTUATOR FOR IMPACT CUTTER

[76] Inventor: Giora Goldman, 15 Hakibuzim Street, Kiriat Haiim, Israel

[21] Appl. No.: 43,361

[22] Filed: Apr. 28, 1987

[30] Foreign Application Priority Data

May 6, 1986 [IL] Israel .................................. 78698

[51] Int. Cl.⁴ .............................................. B23B 45/16
[52] U.S. Cl. ...................................... 173/134; 173/13
[58] Field of Search .................. 173/13, 15, 16, 17, 173/134, 135

[56] References Cited

U.S. PATENT DOCUMENTS

| | | |
|---|---|---|
| 433,642 | 8/1890 | Bourne . |
| 3,322,210 | 5/1967 | Arndt .................................. 173/134 |
| 3,820,197 | 6/1974 | Jeanmaire . |
| 4,100,651 | 7/1978 | Wornall et al. . |
| 4,444,274 | 4/1984 | Suwabe .............................. 173/134 |

Primary Examiner—Frank T. Yost
Assistant Examiner—Willmon Fridie, Jr.
Attorney, Agent, or Firm—Frishauf, Holtz, Goodman & Woodward

[57] ABSTRACT

An impact cutter implement consists of an actuator comprising a large-diameter cylinder in front and a small-diameter cylinder in the rear in coaxial alignment, a large piston and a small piston mounted on a common piston rod and axially movable in the respective cylinders, the piston rod protruding out of the large cylinder and forming a cutter at its front end. The frontal cylinder is connected to a large compressed air vessel, and the rear cylinder to a vessel containing oil, the two vessels being alternately connected to a compressed air supply and to the atmosphere by a valve. Pressurized oil holds the frontal piston in retracted position, until a valve between the oil vessel and the rear cylinder is opened, releasing the oil, whereupon the compressed air in the large air vessel drives the frontal piston forward at substantially uniform pressure and accelerating the cutter to a high impact velocity.

4 Claims, 1 Drawing Sheet

HYDRAULIC-PNEUMATIC ACTUATOR FOR IMPACT CUTTER

BACKGROUND OF THE INVENTION

The invention relates to a hydraulically controlled, pneumatic impact implement and its application in a tool such as a cutter or hammer. It relates particularly to a pneumatic actuator having its piston rod protruding out of the actuator cylinder and serving to impart heavy shocks onto an object to be cut or compressed.

There exist many pneumatic tools such as hammers, riveters, pavement breakers and others, wherein a free-floating piston is oscillatingly and rapidly moved by valve control, and impacts on the rear end of a tool such as a chisel or hammer. On the other hand, there exist long-stroke pile drivers wherein both weight and pneumatic force are combined to impart a strong blow onto the pile head and to drive the pile into the ground.

Up to now all known pneumatic cylinders are designed to be supplied with compressed air through a valve at the far end, which expands with the outerward movement of the piston, whereby the actual force on the piston at the end of the stroke has diminished to the exhaust pressure. In the aforementioned applications this is irrelevant, since the piston is accelerated during its stroke in the cylinder so as to act on the tool by its velocity momentum. However, there exist tools which require a strong force throughout the piston movement such as, for instance, cutters, and it is the object of the present invention to provide a long-stroke, pneumatic impact implement capable of exerting strong pressure of substantially uniform magnitude during the entire stroke of the piston.

It is another object of the invention to provide a pneumatic implement of simple construction and, accordingly, at low cost.

And it is a final object to provide an implement which will require little maintenance due to its few moving components.

SUMMARY OF THE INVENTION

The impact implement comprises essentially a large-diameter piston and a small-diameter piston mounted in distanced alignment on a common piston rod and reciprocatingly movable in a large-diameter, air-filled cylinder, in the following called the "impact actuator", and in a small-diameter, liquid-filled cylinder respectively, in the following called the "control actuator", both cylinders being coaxially and rigidly interconnected at their inner ends, and being open to the atmosphere at their outer ends. A cutting or impact tool is connected to the outer end of the impact piston, while the outer end of the control piston is adapted to operate a switching device. A large-volume pressure vessel communicates with the inner end of the impact actuator and is alternately connected to a source of compressed air and to the atmosphere by a sliding-spool, externally operated flow valve. The inner end of the control actuator is filled with liquid, preferably oil, and communicates with the lower portion of a liquid-filled pressure vessel, the upper portion of which is alternately connected to a source of compressed air and to the atmosphere, by a sliding-spool externally operated flow valve. The liquid line between the control actuator and the liquid-filled vessel contains a check valve permitting flow from the vessel into the actuator, and a stop valve in parallel alignment with the check valve. The valves, of known design, are either solenoid-operated or fluid-operated, in accordance with local conditions. The two sliding-spool valves serving the impact actuator and the control actuator are preferably incorporated in a single control valve which is adapted to alternately connect either pressure vessel to the compressed air source and to the atmosphere.

The impact implement operates as follows: at the beginning of a working cycle the common control valve connects the air pressure vessel to the atmosphere—and with it the impact actuator—, and connects the liquid pressure vessel to the compressed air source. The compressed air urges oil out of the vessel through the check valve into the inner part of the control actuator and moves its piston in outward—or rearward—direction, thereby pulling the impact piston with it. During this operation the stop valve is closed. As soon as the pistons have reached the rear ends, the control piston operates a switching device which energizes the common control valve whereby the air vessel—and with it the impact actuator—are filled with air under pressure, while the oil vessel is connected to the atmosphere; connection between the oil vessel and the control actuator remains interrupted by means of the check valve and the closed stop valve. Owing to the increasing pressure in the impact actuator cylinder the pressure in the control actuator increases at the rate of the respective cylinder cross sections, however the incompressibility of the oil permits almost no movement in forward direction, and the impact cylinder is held in its rearward position by the control actuator piston.

As soon as the implement is to exert a stroke, the stop valve is caused to open, releasing the pressure in the control actuator into the oil vessel which is at atmospheric pressure. Owing to cessation of the retaining force the impact piston is propelled in forward direction by the compressed air in the cylinder and in the air pressure vessel, whereby the large air volume contained in the pressure vessel causes the pressure in the cylinder to remain almost constant during the entire stroke, thereby accelerating the piston to a high velocity which causes a strong impact of the attached tool on the body to be cut or to be compacted. As soon as the pistons have reached the front end, the switching mechanism at the rear end of the control actuator reverses the action of the common control valve into its initial position, permitting a new impact cycle. The switching mechanism is provided with a delay device, in order not to operate the control valve before the end of the stroke. The stop valve is likewise being closed upon reversal of the operation.

SHORT DESCRIPTION OF THE DRAWING

FIG. 1 is a longitudinal section through one embodiment of an impact implement of the invention, in schematic outlines.

DESCRIPTION OF A PREFERRED EMBODIMENT

Figure 1:
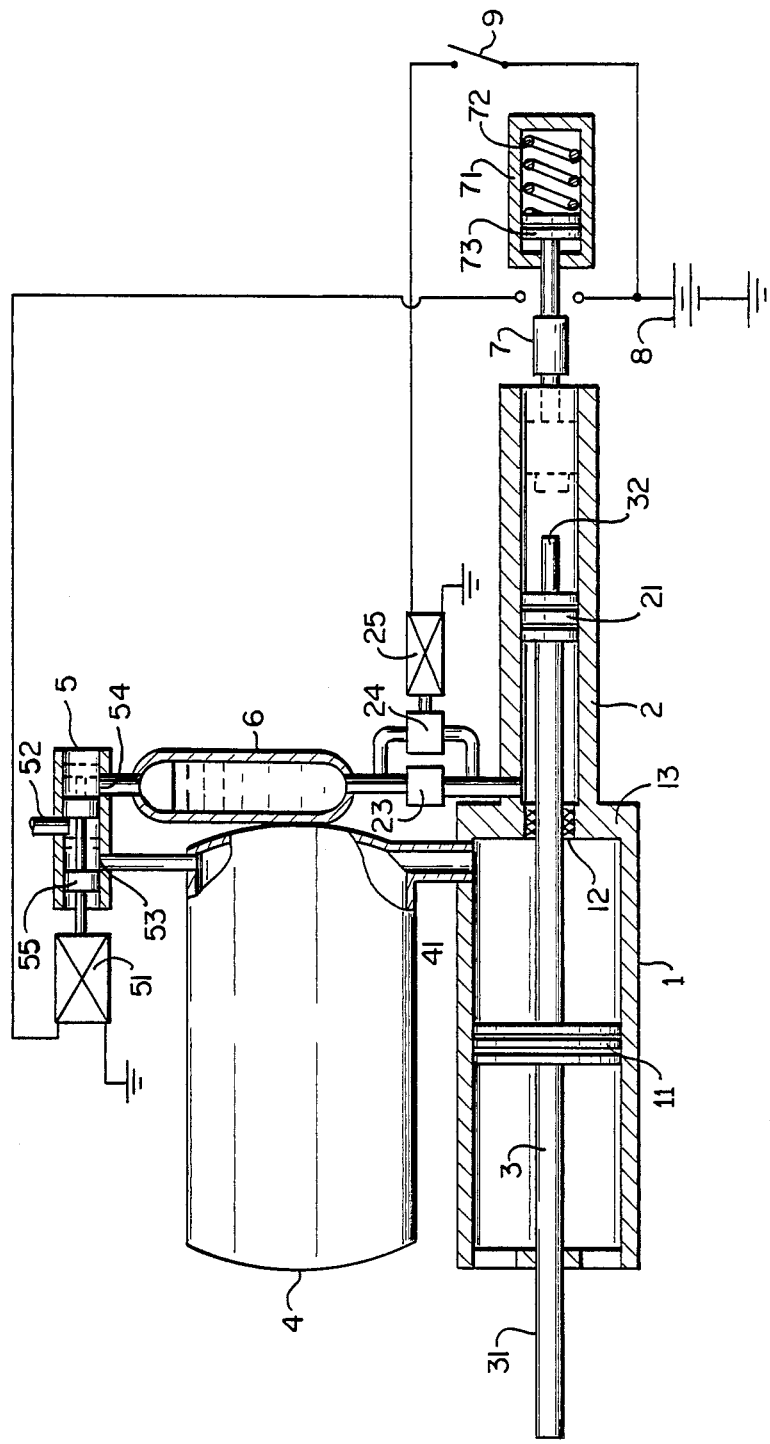

Referring to the drawing an impact implement comprises an impact actuator and a control actuator in the form of a large-diameter cylinder 1 back-to-back with a small-diameter cylinder 2, each containing a piston 11 and 21 respectively. The two pistons are interconnected by a common piston rod 3 which passes through an opening in the partition wall 13 between the two cylinders sealed by a two-way seal 12. The two cylinders are open to the atmosphere at their outer ends, both being single-acting. The piston rod 3 extends beyond the piston 11 and beyond the cylinder 1 (31) and is connected to a tool, such as a cutter, a hammer or the like. The piston rod also extends slightly beyond the control piston 21 and serves to operate a switching device 7 to be described furtheron.

The inner end of the cylinder 1 communicates with a large-volume pressure vessel 4 by means of a wide connecting pipe 41, which offers practically no resistance to rapid air flow from the vessel into the cylinder. The pressure vessel is connected to a sliding-spool directional flow-valve 5 which is governed by a solenoid 51 and which connects the pressure vessel alternatively to a compressed air supply and to the atmosphere.

The inner end of the control cylinder is connected to the bottom portion of a pressure vessel 6 filled to its greatest part with a liquid, preferably oil, the line connecting the cylinder to the vessel containing a check valve 23 and a solenoid-operated stop valve 24, in parallel position. The check valve permits oil flow from the vessel into the cylinder but prevents reverse flow; the operation of the stop valve will be described furtheron.

The sliding-spool flow valve 5 is connected to a compressed air supply by an inlet port 52 and to the two pressure vessels, 4 and 6, by the respective outflow ports 53 and 54. a sliding spool 55 is moved in the valve housing by a solenoid 51; in energized state it lets compressed air flow into the air vessel 4 via the ports 52 and 53, while the oil vessel 6 is open to the atmosphere via port 54. This position is shown in full lines. In released state of the solenoid the spool moves to the right as shown in broken lines, connecting the air vessel 4 to the atmosphere and the vessel 6 to the compressed air supply.

The piston rod 3 is provided with an extension 32 protruding out of the control cylinder when this is in its rearward position, (shown in broken lines). This extension operates a switching device 7 which connects an electric power supply, such as a storage battery 8, to the solenoid 51 of the spool valve 5. The battery is also connected to a solenoid 25 of the stop valve 24 which is closed in non-energized state of the solenoid. The switching device is provided with a time delay 71, consisting of a return spring 72 and a piston 73 moving in the cylinder of the time delay, thus delaying the action of the spring by means of a small pin hole in the cylinder which allows the air to escape at a slow rate only.

Before any cutting or compacting operation the pistons 11 and 21 are in their rearmost positions, while the piston rod extension 32 keeps the switching device 7 in closed position, thus energizing the solenoid 51. The solenoid pulls the spool 55 to the left, thus connecting the air vessel 4 to the air supply and the oil vessel 6 to the atmosphere. In spite of the vessel 6 being at atmospheric pressure, the pressure in the control actuator remains high, since it is separated from the vessel by the check valve 23 and the stop valve 24. In fact, the pressure in this actuator rises to a multiple of the air pressure in the impact cylinder, at the ratio of the annular cross sections of the two cylinders. The drawing shows clearly that the annular space between the cylinder wall 2 and the piston rod 3 is very narrow, an important point, whereby the oil volume in the control actuator is kept to a minimum.

As long as the sliding spool is in the position shown in full lines, the air pressure urges the piston 11 in forward direction (to the left of the drawing), but it is held under tension owing to the retaining force of the control piston 21, which prevents oil from escaping along the cylinder walls. In order to operate the implement the switch 9 is closed, thereby energizing the solenoid 25 and opening the valve 24. This action releases the pressure in the control actuator to atmospheric pressure, permitting the air pressure in the impact cylinder and in the air vessel 4 to drive the piston 11 and the piston rod extension 31 forward (to the left of the drawing). Since the volume of the pressure vessel is a multiple of the cylinder volume, the air pressure decreases only slightly during the piston stroke, and the piston is continuoulsy accelerated so as to meet the obstacle with great force, either cutting or tamping it, whatever the purpose and the tool attached to the piston rod extension 31. The forward motion of the pistons releases the switching device 7 which is opened by the force of the spring 72, but the final opening is delayed by the slow movement of the switch piston 73, until the actuator pistons have reached the forward end or the object to be cut. Opening of the switch 7 de-energizes the solenoid 51, whereby the sliding spool moves to the right into the position shown in broken lines. Hereby the pressure vessel 4 is connected to the atmosphere and compressed air is admitted to the oil vessel 6 pressing oil into the control actuator and moving the pistons to the rear (to the right). At the end of this movement the switch 7 is closed again, whereby the initial state of affairs is attained. In the meantime the switch 9 has been re-opened, thus closing the stop valve and keeping the cylinder 2 under pressure.

The switch 9 may be operated manually or by movement of the implement itself: it is, for instance, proposed to place two implements of the same kind on a carriage and to attach to them a horizontal blade for the purpose of severing the steel bandages tying cotton bales. The switch, in this case, is placed forward of the blade and will be closed by contact with the bale. After cutting, the switch will open automatically and close the valve 24.

It will be understood that the aforedescribed embodiment represents only one example of the many possible embodiments, of which a few examples will be described in the following:

The delaying mechanism is designed to prevent the movement of the sliding spool valve 5 before the impact has taken place. Instead of incorporating this delay mechanism in the switching device 7, it could be attached to the sliding spool, which would then change its position only after arrival of the pistons at the front end.

Instead of electric solenoid valves, pneumatically or hydraulically operated valves may be installed and connected by piping instead of by wiring. This arrangement may often be more convenient than electric control, for the reason, that compressed air must be available, either by means of a compressor or by means of compressed gas cylinders.

Instead of the switching device 7 any other device may be employed for changing the position of the sliding spool valve, and it will not be necessary to cause this switch-over by means of the control actuator, but by electronic means in a manner known to the art.

Instead of the one combined spool valve serving both pressure vessels, two separate valves may be installed, one for each vessel, if this arrangement is advantageous for positional reasons.

I claim:

1. An impact implement for cutting through an object with great force, said implement having a front end and a rear end, and further comprising:
- a single-acting impact actuator comprising a large-diameter cylinder (1) positioned at said front end and a large diameter piston (11) contained in said large-diameter cylinder (1);
- a single-acting control actuator comprising a small-diameter cylinder (2) positioned at said rear end and a small diameter piston (22) contained in said small-diameter cylinder (2);
- said large and small diameter cylinders being coaxially and rigidly connected together and separated by a common partition (13) between said cylinders, and said large and small diameter pistons being connected together by a common piston rod (3) sealingly passing through said partition (13) between said cylinders;
- a cutting tool attached to a front end of an extension of said piston rod (3) which is rigidly connected to said piston (11) of said impact actuator and which protrudes out of a front end of said large-diameter impact actuator cylinder;
- a large-size air pressure vessel (4) communicating with a rear end of said large-diameter impact actuator cylinder (1) by means of a large-diameter pipe (41);
- a liquid-filled pressure vessel (6) communicating with a front end of said small-diameter control actuator cylinder (2) through a check valve (23) and a stop valve (24) in parallel alignment;
- valve means for alternatively connecting said air pressure vessel (4) and said liquid-filled pressure vessel (6) to the atmosphere and to a supply of compressed air;
- said control actuator retaining said tool in a retracted position, against the pressure on said large diameter piston (11) of said impact actuator by compressed air contained in said cylinder (1) of said impact actuator and in said air pressure vessel (4), and releasing said large diameter piston (11) and said tool upon opening of said stop valve (24), thereby connecting said control actuator to the atmosphere, whereby compressed air contained in said impact actuator cylinder (1) and in said pressure vessel (4) drives said large diameter piston (11) and said tool forward at substantially constant air pressure.

2. The impact implement of claim 1, wherein said valve means comprises a solenoid-operated sliding-spool valve (5) having a solenoid (51), an inlet port (52) coupled to said supply of compressed air, a first outlet port (53) coupled to said air pressure vessel (4), and a second outlet port (54) coupled to said liquid-filled pressure vessel (6), said valve further having two ends which are open to the atmosphere.

3. The impact implement of claim 2, further comprising switching means (7) operatively coupled to an extension rearwardly extending from said piston (21) of said control actuator for energizing said solenoid (51) of said sliding-spool valve (5).

4. The impact implement of claim 3, further comprising a delay device (71) for delaying a switching operation of said sliding-spool valve (5).

* * * * *